(12) United States Patent
Morales et al.

(10) Patent No.: US 11,358,441 B2
(45) Date of Patent: Jun. 14, 2022

(54) VEHICLE AIR VENT MANUAL CONTROL ASSEMBLY

(71) Applicant: Faurecia Interior Systems, Inc., Auburn Hills, MI (US)

(72) Inventors: Giovany Morales, Puebla (MX); Julien Bleker, Villiers le Bel (FR); Sachin Patil, Puebla (MX)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 31 days.

(21) Appl. No.: 16/866,104

(22) Filed: May 4, 2020

(65) Prior Publication Data
US 2021/0339608 A1 Nov. 4, 2021

(51) Int. Cl.
*F23L 17/12* (2006.01)
*B60H 1/34* (2006.01)

(52) U.S. Cl.
CPC ... *B60H 1/3421* (2013.01); *B60H 2001/3471* (2013.01)

(58) Field of Classification Search
CPC .................. B60H 1/3421; B60H 2001/3471
See application file for complete search history.

(56) References Cited

U.S. PATENT DOCUMENTS

| 6,533,655 B2 | 3/2003 | Demerath et al. |
| 2006/0172680 A1* | 8/2006 | Gehring ............... B60H 1/3428 454/152 |
| 2018/0283729 A1* | 10/2018 | Terasawa ............ F24F 13/1426 |

FOREIGN PATENT DOCUMENTS

| CN | 206968353 U | 2/2018 | |
| DE | 202010000445 U1 | 7/2010 | |
| EP | 1207062 A2 * | 5/2002 | ........... B60H 1/3421 |
| EP | 1207062 A2 | 5/2002 | |
| JP | 3176136 U | 6/2012 | |
| JP | 2013226857 A | 11/2013 | |
| JP | 2019084854 A | 6/2019 | |

OTHER PUBLICATIONS

Monroe, "The Purpose of Washers and Why They're Used With Fasteners", Apr. 11, 2019, https://monroeengineering.com/blog/the-purpose-of-washers-and-why-theyre-used-with-fasteners/ (Year: 2019).*

* cited by examiner

*Primary Examiner* — Steven S Anderson, II
(74) *Attorney, Agent, or Firm* — Reising Ethington P.C.

(57) ABSTRACT

A vehicle air vent manual control assembly can be equipped at a passenger compartment of an automobile. Example installations include at an instrument panel, at a B-pillar, and at a rear center console. The vehicle air vent manual control assembly includes a knob through which a user can manipulate a first set of air directive vanes, a second set of air directive vanes, and a shutoff flap. Pivotal movement of a shaft via the knob prompts movement of the first set of air directive vanes. Translational movement of the shaft via the knob prompts movement of the second set of air directive vanes. And rotational movement of the shaft prompts movement of the shutoff flap.

15 Claims, 10 Drawing Sheets

VEHICLE AIR VENT MANUAL CONTROL ASSEMBLY

TECHNICAL FIELD

The present disclosure is related generally to vehicle air vents and, more particularly, to vehicle air vent assemblies for controlling direction of exiting air and volume of exiting air.

BACKGROUND

Automotive vehicles are equipped with heating, ventilation, and air conditioning (HVAC) systems for managing climate within passenger compartments. Air enters a passenger compartment through a number of air vents dispersed at different locations in the passenger compartment. Air vents can be located at an instrument panel, at a B-pillar, and at a rear center console, among other possible locations. Air vent assemblies enable drivers and passengers to control the direction of air coming out of the air vents, and to control the volume of air exiting the vents. Drivers and passengers can fully close air vents too. In some cases, the control of air direction, air volume, and vent closing is carried out in two places at the air vents through two distinct user components. In other cases, that control is carried out in a single place through a single user component.

U.S. Pat. No. 6,533,655 to Demerath et al. is an example of the latter. The '655 patent discloses an air escape for vehicle ventilation systems with a manual adjusting means for an air outflow direction and for an air outflow volume. A single operating knob is presented by the disclosure. The single operating knob is movable in translation and moveable in rotation. The translational movement causes a change in the air outflow direction, while the rotational movement causes a change in the air outflow volume.

SUMMARY

An illustrative vehicle air vent manual control assembly includes a first set of air directive vanes, a second set of air directive vanes, a shutoff flap, a slider housing, and a shaft and joint assembly. The first and second sets of air directive vanes are generally arranged transverse to one another. The slider housing is situated between a pair of the first set of air directive vanes. The shaft and joint assembly includes a shaft, a joint, and a knob. The shaft spans through the slider housing, and the knob is carried by the shaft. By way of user manipulation of the knob, pivotal movement of the shaft at the joint prompts movement of the first set of air directive vanes. Translational movement of the shaft with respect to the slider housing prompts movement of the second set of air directive vanes, and rotational movement of the shaft about a shaft axis prompts movement of the shutoff flap.

In various embodiments, the slider housing is situated between the pair of the first set of air directive vanes by way of a coupling. The coupling occurs between the slider housing and one or more walls of the pair of the first set of air directive vanes.

In various embodiments, the slider housing includes a slider pad. The slider pad receives a section of the shaft and partly or more supports the shaft at the slider housing. The slider pad translates in the slider housing amid translational movement of the shaft relative to the slider housing.

In various embodiments, the slider housing includes a first washer and a second washer. The first washer receives a section of the shaft near a frontend of the slider housing. The second washer receives another section of the shaft near a rearend of the slider housing.

In various embodiments, the slider housing has a first side, a second side, a third side, and a fourth side. Upon translational movement of the shaft relative to the slider housing, the shaft translates relative to the first and second sides. And upon pivotal movement of the shaft at the joint, the shaft lacks movement relative to the third and fourth sides.

In various embodiments, the slider housing resides wholly within a lateral extent of the pair of the first set of air directive vanes, and resides wholly within a transverse extent of the pair of the first set of air directive vanes.

In various embodiments, the slider housing has a first wall and has a second wall. The translational movement of the shaft relative to the slider housing is a sliding movement toward and away from the first and second walls.

In various embodiments, the shaft is supported at the slider housing by way of one or more washers. The shaft lacks direct support by the first set of air directive vanes.

In various embodiments, the shaft and joint assembly includes a lever. The joint joins the lever and the shaft together. The joint has a link yoke and a pin at the junction between the lever and the shaft. The joint effects relative movement between the lever and the shaft.

In various embodiments, the shaft and joint assembly includes a first gear. Upon rotational movement of the shaft about the shaft axis, the first gear engages with a second gear of the shutoff flap in order to prompt movement of the shutoff flap.

In various embodiments, the shaft and joint assembly includes a lever and a second joint. The lever is joined to the shaft by way of the joint, and the lever is joined to a first gear by way of the second joint. The joint transmits rotational movement between the lever and the shaft. And the second joint transmits rotational movement between the lever and the first gear.

In various embodiments, the slider housing includes a slider pad that facilitates translational movement of the shaft with respect to the slider housing. The slider housing further includes a first washer and a second washer. The joint is of the cardan joint type. The shaft and joint assembly includes a lever, a first gear, and a second joint. The lever is joined to the shaft by way of the cardan joint. The first gear can be engaged with a second gear of the shutoff flap. The second joint joins the lever and the first gear together.

In various embodiments, a detent spring interacts with one or more grooves of the shaft. The detent spring works to provide haptic feedback to a user amid rotational movement of the shaft about the shaft axis and when the shutoff flap is at a fully closed state or is at a fully open state.

In various embodiments, a first clearance resides in a transverse direction between forward ends of the pair of the first set of air directive vanes and the slider housing. A second clearance resides in a crosswise direction between a first confronting surface of a first of the pair of the first set of air directive vanes and an outside surface of the shaft. The second clearance is located near the first clearance. A third clearance resides in a crosswise direction between a second confronting surface of a second of the pair of the first set of air directive vanes and the outside surface of the shaft. The third clearance is located near the first clearance.

In various embodiments, the knob is a single knob of the vehicle air vent manual control assembly. Movement of the first set of air directive vanes and movement of the second set of air directive vanes, as well as movement of the shutoff flap, are all prompted by way of user manipulation of the single knob.

It is contemplated than any of the above-listed features can be combined with any other feature or features of the above-described embodiments or the features described below and/or depicted in the drawings, except where there is an incompatibility of features.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

An embodiment of a vehicle air vent manual control assembly is presented in the figures and described below. The assembly can be equipped in an automobile as part of a larger heating, ventilation, and air conditioning (HVAC) system for managing climate inside of a passenger compartment. Multiple installations within an individual passenger compartment can include the vehicle air vent manual control assembly such as at an instrument panel, at a B-pillar, and at a rear center console, among other possible locations. A first set of air directive vanes, a second set of air directive vanes, and a shutoff flap are all controlled by user manipulation of a single knob. The single knob hence combines user command of both direction and volume of exiting air downstream of the vehicle air vent manual control assembly. Full closure of the shutoff flap is also carried out at the single knob. Pivotal movement via the knob moves the first set of air directive vanes, translational movement via the knob moves the second set of air directive vanes, and rotational movement via the knob moves the shutoff flap open and close. Furthermore, unlike past designs, the vehicle air vent manual control assembly is designed to present the knob as its sole class A surface that is visible to a user for manipulation by the user. The figures show an example of the vehicle air vent manual control assembly meant for use at an instrument panel, but the teachings below are suitable for use at a B-pillar, rear center console, and elsewhere in a passenger compartment.

Figure 1:
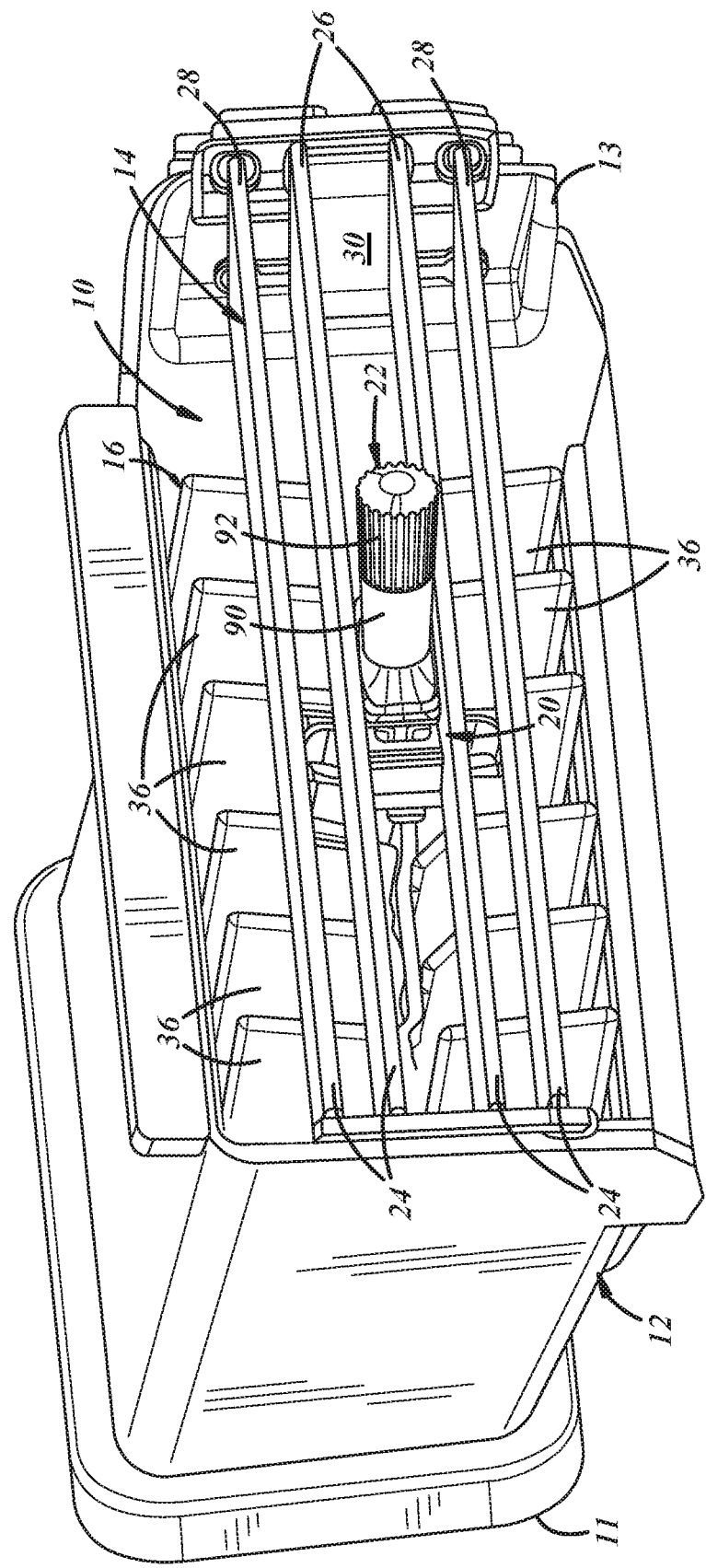
FIG. 1 is a perspective view of an embodiment of a vehicle air vent manual control assembly.

FIG. 1 presents an exemplary vehicle air vent manual control assembly 10 (hereafter, air vent assembly 10) and a housing 12 surrounding and supporting certain components of the air vent assembly 10. Airflow travels through the housing 12 from a backend 11 thereof to a frontend 13. The housing 12 can have various walls and flanges and other structures to facilitate its fit and installation at an intended location in a passenger compartment—in this regard, the design and construction of the housing 12 will vary in different applications. Similarly, the air vent assembly 10 can have various designs, constructions, and components in different embodiments depending in part on its intended application. In the embodiment of the figures, the air vent assembly 10 includes a first set of air directive vanes 14, a second set of air directive vanes 16, a shutoff flap 18, a slider housing 20, and a shaft and joint assembly 22.

Figure 2:
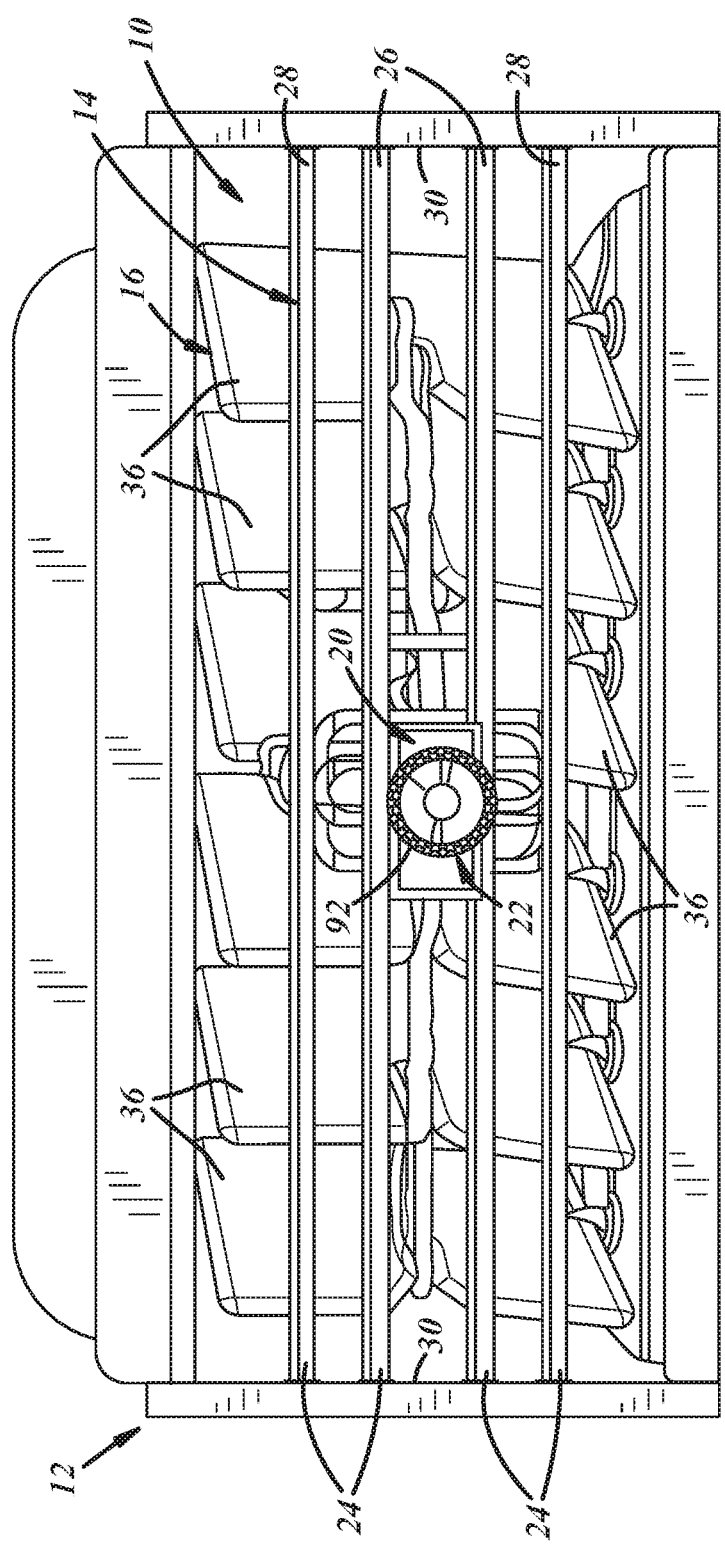
FIG. 2 is a front view of the vehicle air vent manual control assembly, this view depicting one set of air directive vanes moved leftward.
Figure 3:
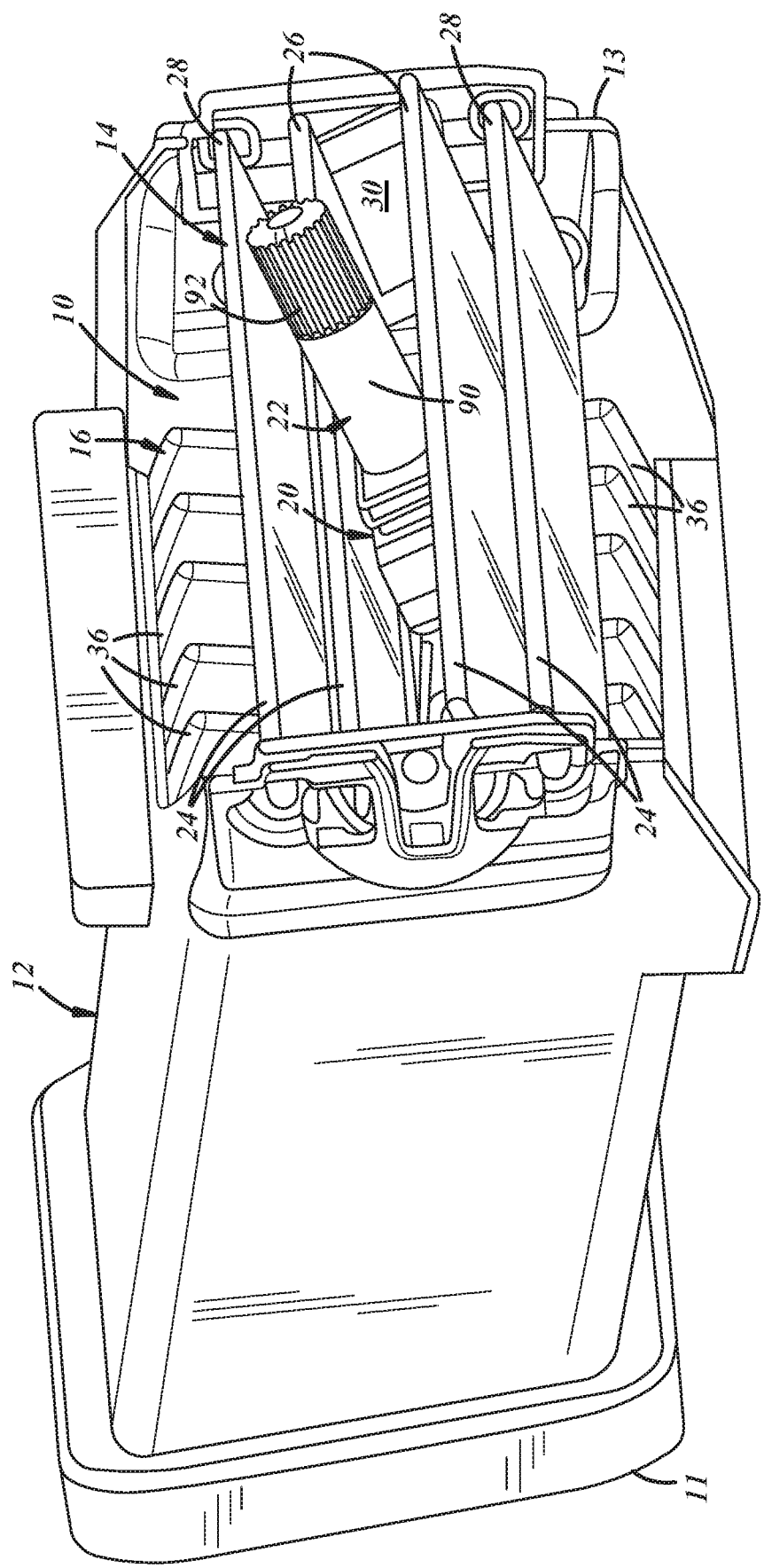
FIG. 3 is another perspective view of the vehicle air vent manual control assembly, this view depicting another set of air directive vanes moved upward.
Figure 7:
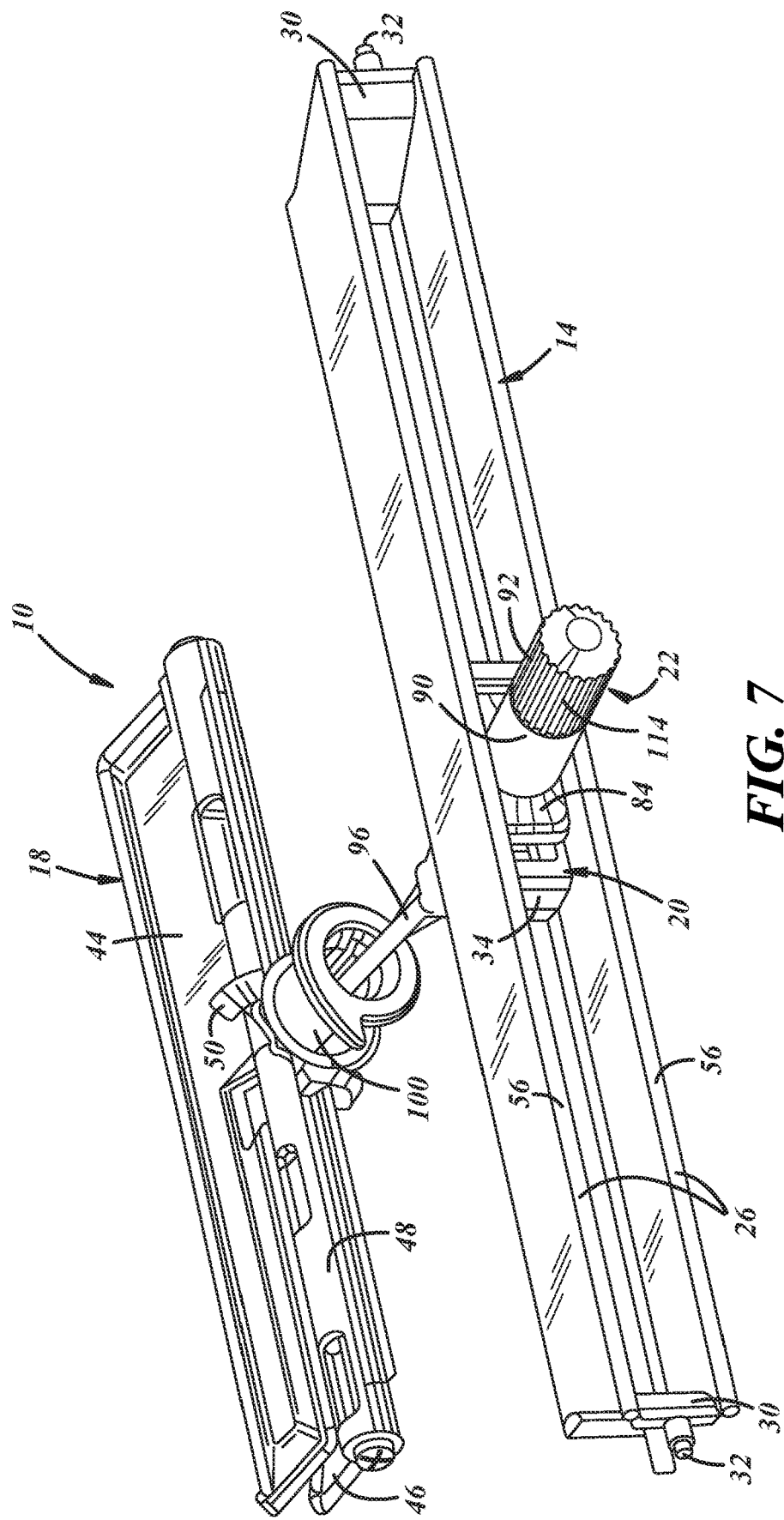
FIG. 7 is an isolated perspective view of the vehicle air vent manual control assembly.
Figure 8:
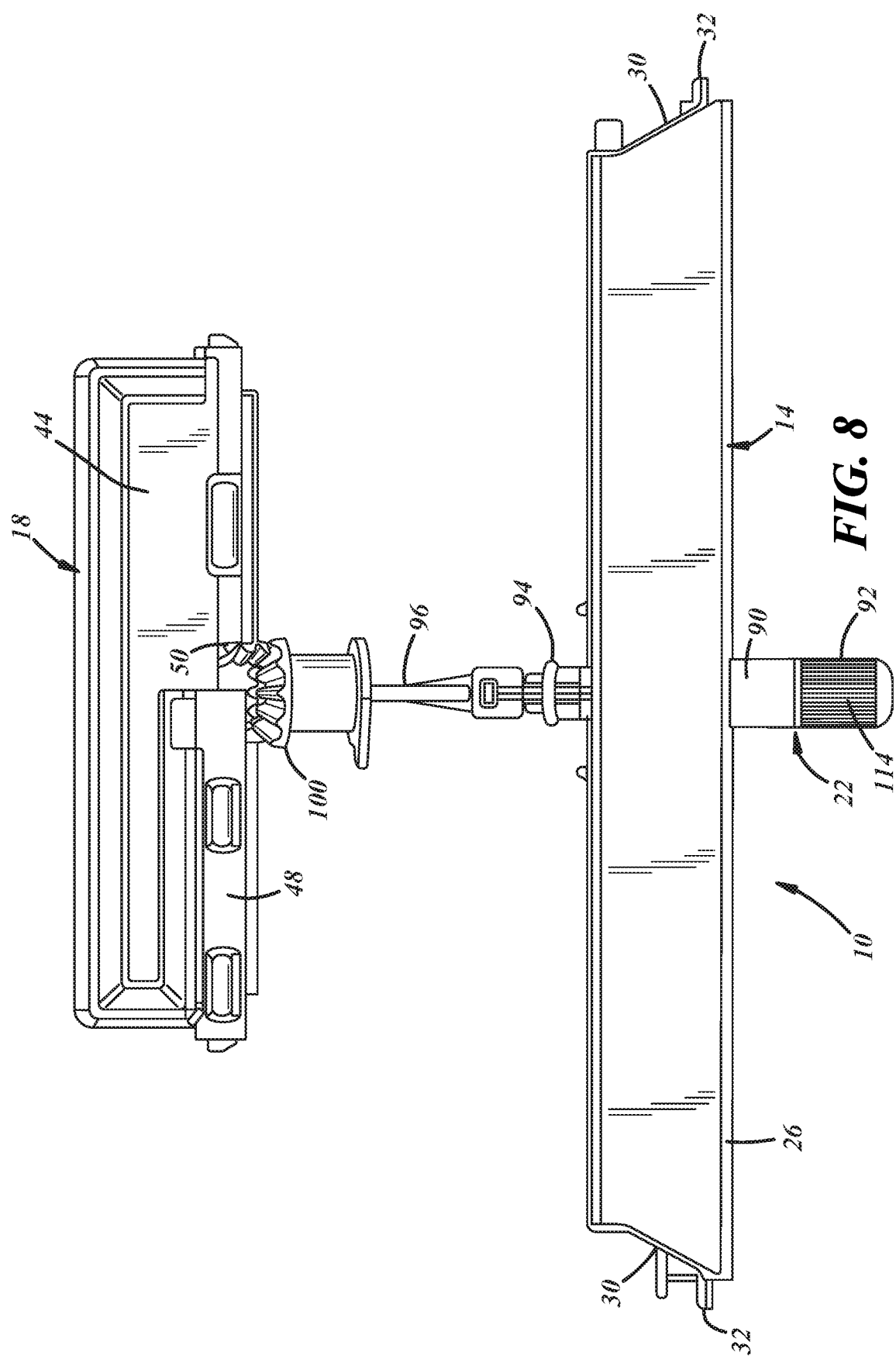
FIG. 8 is an isolated top view of the vehicle air vent manual control assembly.

The first set of air directive vanes 14 serves to aim exiting air of the air vent assembly 10 in the upward and downward directions according to the orientation of the figures. In this embodiment, the first set of air directive vanes 14 is a set of horizontal vanes. With particular reference to FIGS. 2 and 3, multiple individual vanes 24 make-up the first set of air directive vanes 14. The vanes 24 can be pivotally carried by the housing 12. The vanes 24 are parallel to one another, and remain in parallel when they move and turn about their respective pivots amid use of the air vent assembly 10. A pair of master vanes 26 are linked to upper and lower slave vanes 28 and drive concurrent upward and downward movement thereof. Movement of the master and slave vanes 26, 28 is in unison with one another. Referring now to FIG. 7, the master vanes 26 can be a single-piece construction with vertical walls extending between the horizontally-directed master vanes 26. Vertical outer walls 30 have pins 32 inserted into reception holes of the housing 12, and vertical inner walls 34 provide a structure through which the slider housing 20 is coupled to the master vanes 26. FIG. 2 shows the first set of air directive vanes 14 aiming air straightaway from the air vent assembly 10, while FIG. 3 shows the first set of air directive vanes 14 aiming air upward therefrom. Still, the first set of air directive vanes 14 could have a different design and construction than described here.

Figure 4:
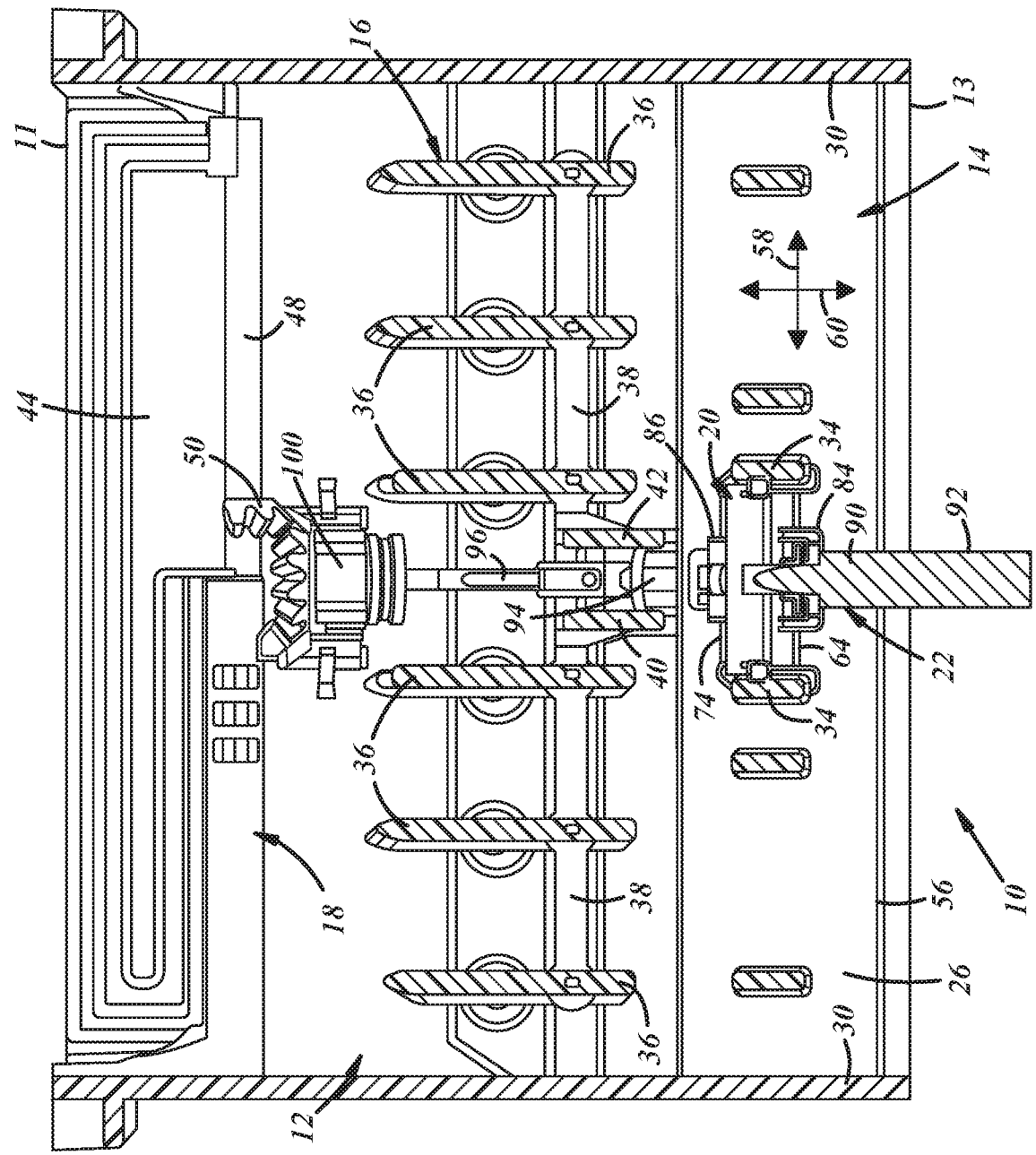
FIG. 4 is a sectional view of the vehicle air vent manual control assembly.

The second set of air directive vanes 16 serves to aim exiting air of the air vent assembly 10 in the leftward and rightward directions according to the orientation of the figures. In this embodiment, the second set of air directive vanes 16 is a set of vertical vanes arranged transversely to the first set of air directive vanes 14. The second set of air directive vanes 16 is positioned upstream of the first set of air directive vanes 14 relative to the general direction of airflow travel through the housing 12. With particular reference to FIGS. 2-4, multiple individual vanes 36 make-up the second set of air directive vanes 16. The vanes 36 can be pivotally carried by the housing 12. The vanes 36 are parallel to one another, and remain in parallel when they move and turn about their respective pivots amid use of the air vent assembly 10. Referring to FIG. 4, a link 38 unites movement of the vanes 36 so that they turn side-to-side in unison with one another. A first and second link wall 40, 42 extend from the link 38 and reside on each side of the shaft and joint assembly 22 and sandwich the assembly 22 in close abutment. Translational movement of the shaft and joint assembly 22 urges translational movement of the link 38 via the first and second link walls 40, 42. The vanes 36 turn leftward or rightward in response. FIG. 4 shows the second set of air directive vanes 16 aiming air straightaway from the air vent assembly 10, while FIG. 2 shows the second set of air directive vanes 16 aiming air leftward therefrom. Still, the second set of air directive vanes 16 could have a different design and construction than described here.

Figure 5:
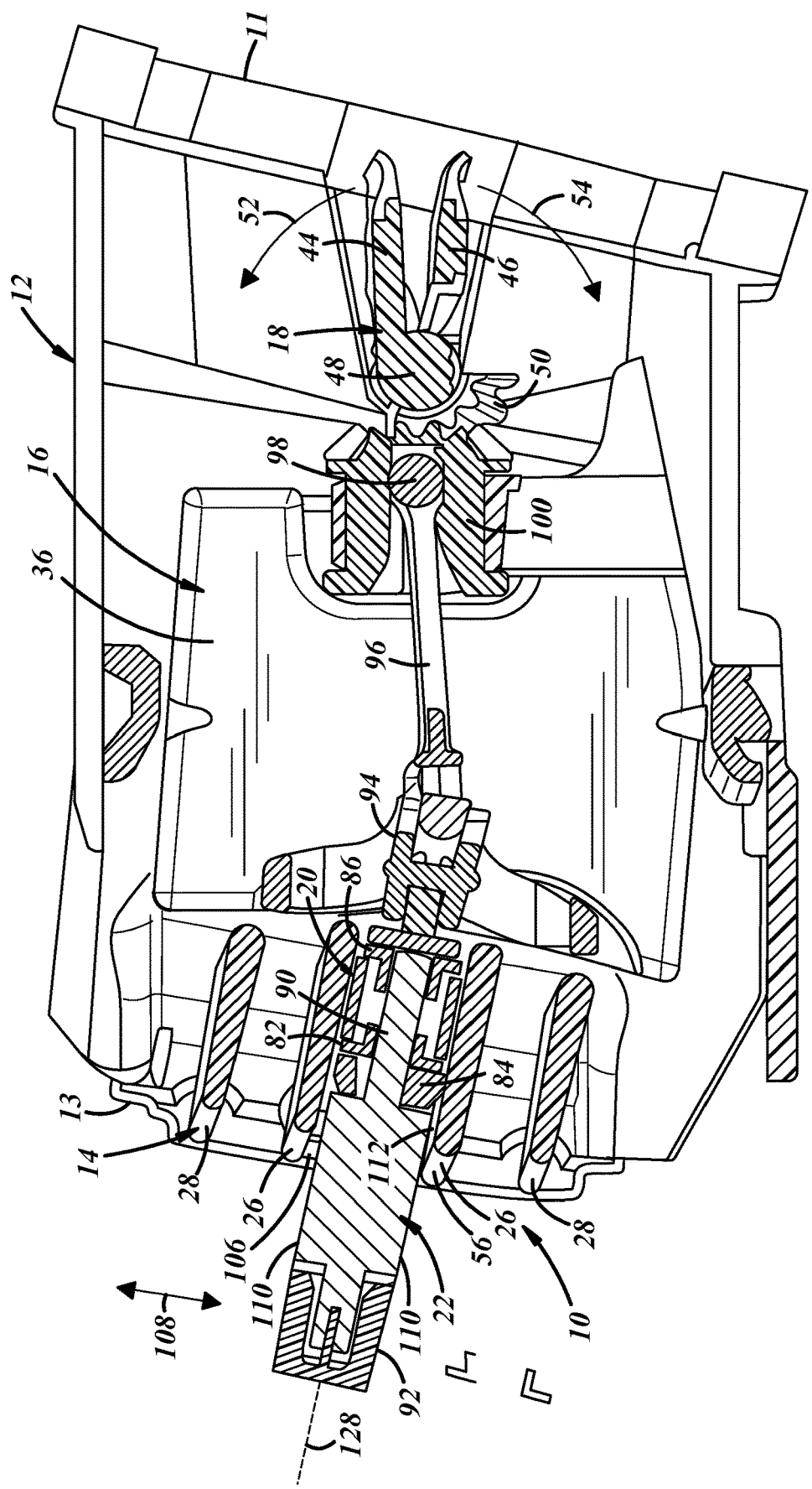
FIG. 5 is another sectional view of the vehicle air vent manual control assembly; this sectional view being taken transversely to the sectional view of FIG. 4.

The shutoff flap 18 opens and partially closes to adjust the volume of exiting air of the air vent assembly 10. When fully open, the shutoff flap 18 permits its greatest amount of air. Partially closed states permit less and less amounts of air. For cessation of exiting air, the shutoff flap 18 can be fully closed. With reference to FIGS. 4, 5, and 7-9, in this embodiment the shutoff flap 18 is supported by opposite walls of the housing 12 and is positioned upstream of the first and second sets of air directive vanes 14, 16 relative to the general direction of airflow travel through the housing 12. Here, the shutoff flap 18 is of the butterfly flap type. A first flap 44 and a second flap 46 are carried by a shaft 48, and a gear 50 extends from the shaft 48 for engagement with a gear (presented below) of the shaft and joint assembly 22. Referring particularly to FIG. 5, when incited by the shaft and joint assembly 22 via gear engagement, the first and second flaps 44, 46 simultaneously spread apart and revolve about the shaft 48. The first flap 44 moves over direction 52 and the second flap 46 moves over direction 54. When fully closed, the first and second flaps 44, 46 make sealing abutment with inside walls and surfaces of the housing 12. Still, the shutoff flap 18 could have a different design and construction than described here.

The slider housing 20 is situated between a pair of neighboring vanes of the first set of air directive vanes 14. In the embodiment of the figures, this pair of neighboring vanes is the master vanes 26. The shaft and joint assembly 22 is partly supported by the slider housing 20, and its movements to operate the first and second sets of air directive vanes 14, 16 are partly facilitated by the slider housing 20. The slider housing 20 can have various designs, constructions, and components in different embodiments. In the embodiment of the figures, and referring now to FIGS. 4, 6, and 7, the slider housing 20 is positioned at an approximate midsection of the master vanes 26 where it is setback from forward ends 56 of the master vanes 26 and not readily accessible nor visible by a user. The slider housing 20 resides wholly within a lateral extent of the master vanes 26, and wholly within a transverse extent of the master vanes 26 (see lateral direction 58 and transverse direction 60 in FIG. 4). At its location, a first clearance 62 (FIG. 6) is established over the transverse direction 60 between the forward ends 56 of the master vanes 26 and a frontend 64 of the slider housing 20.

Figure 9:
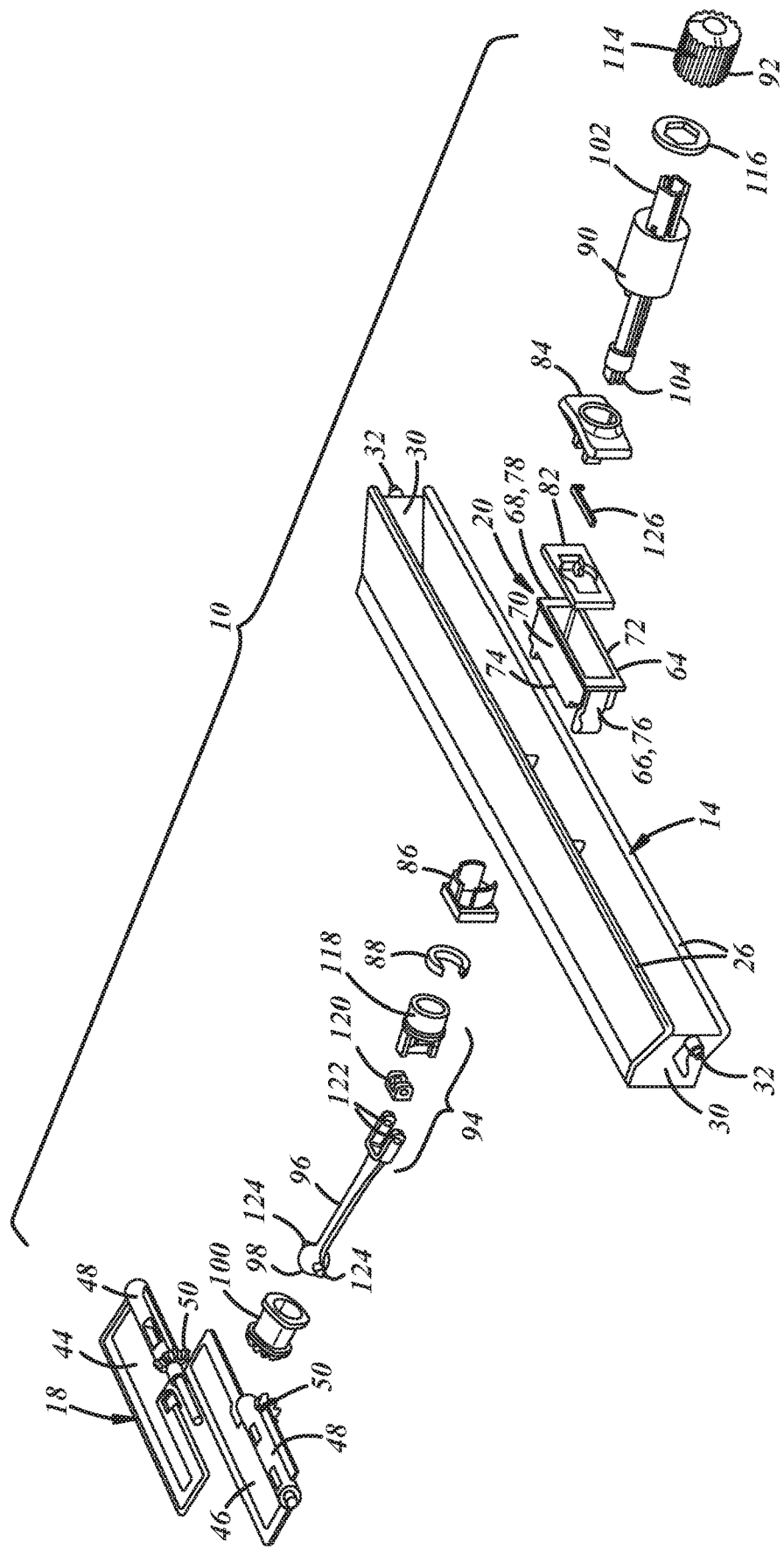
FIG. 9 is an exploded view of the vehicle air vent manual control assembly.

With reference also to FIG. 9, the slider housing 20 is a separate and distinct component apart from the other main components of the air vent assembly 10. It has a rectangular structure with a first side 66, a second side 68, a third or top side 70, and a fourth or bottom side 72. The frontend 64 is an open end and a rearend 74 is likewise an open end. A shaft component (presented below) of the shaft and joint assembly 22 spans through these open ends. The first side 66 has a first sidewall 76 and, similarly, the second side 68 has a second sidewall 78. As perhaps shown best by FIG. 6, the slider housing 20 is retained at its position at the master vanes 26 by a coupling. The coupling occurs, in this embodiment, between the first sidewall 76 and the vertical inner wall 34 at that particular site, and between the second sidewall 78 and the vertical inner wall 34 thereat. The inner walls 34 are received in grooves 80 in the first and second sidewalls 76, 78. When the slider housing 20 is coupled in place, both lateral and transverse movements are restrained by the inner walls 34, while crosswise (up and down) movements are restrained by the master vanes 26. Still, the coupling could be carried out in other ways in other embodiments.

Figure 6:
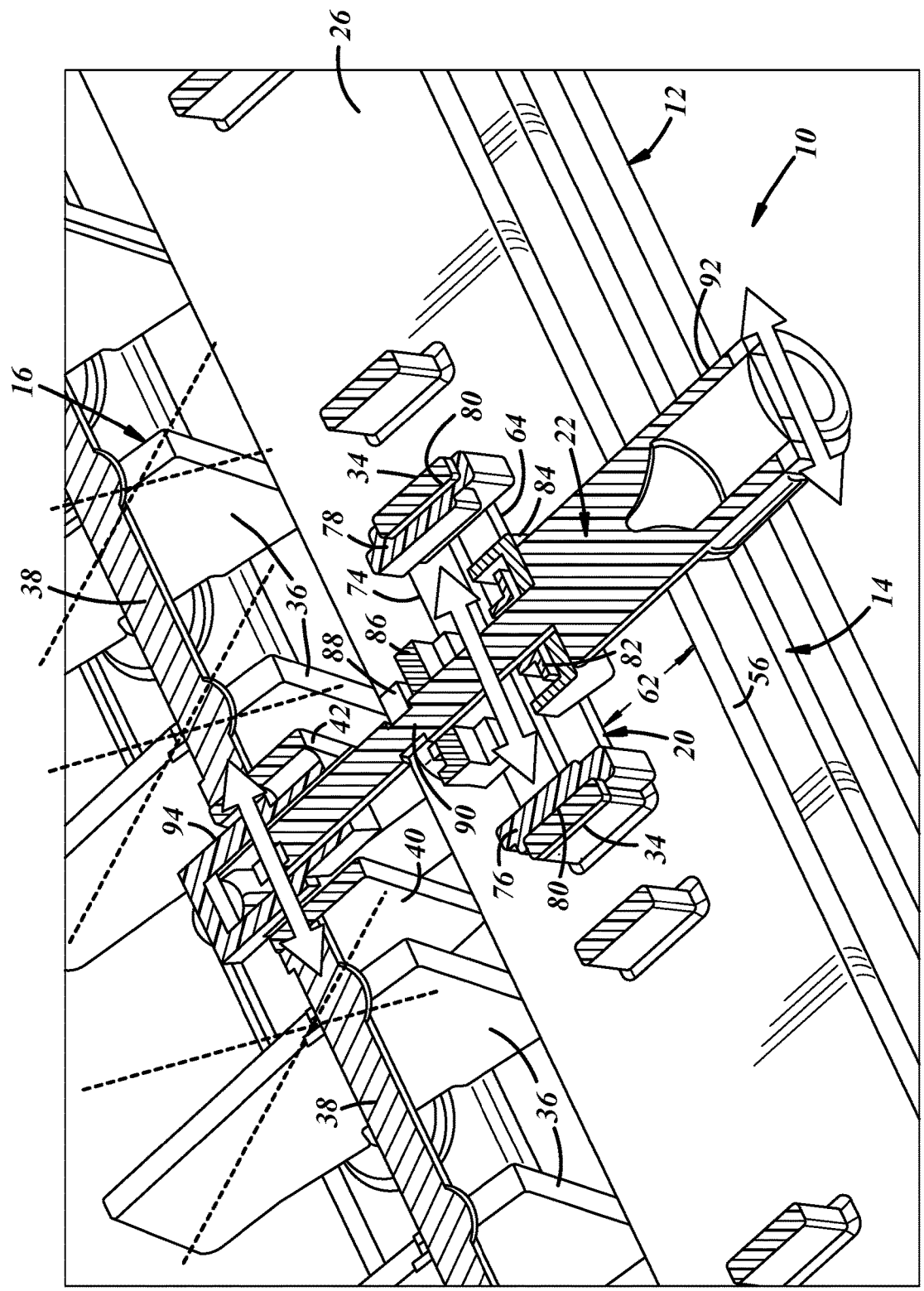
FIG. 6 is an enlarged sectional view of a slider housing component and a shaft component of the vehicle air vent manual control assembly.

In the embodiment of the figures the slider housing 20 includes several components. Referring now to FIGS. 6 and 9, a slider pad 82 and a first and second washer 84, 86 are provided. The slider pad 82 serves to aid translational movement of the shaft and joint assembly 22 at the slider housing 20 amid movement of the second set of air directive vanes 16. The user experiences a smoother feel at the knob 92 amid translational movement via the slider pad 82. The slider pad 82 can be composed of a silicon material according to one example. The slider pad 82 receives a section of the shaft component of the shaft and joint assembly 22 and hence slides laterally back and forth between the first and second sidewalls 76, 78 during use of the assembly 22. Sliding surface-to-surface abutment is made between the slider pad 82 and an inside surface of the slider housing 20. Minimized friction is generated at the surface-to-surface abutment due to the material composition of the slider pad 82. Because the slider pad 82 behaves in a somewhat elastomeric fashion, it can serve to accommodate dimensional variations among parts and components in its vicinity. When assembled together, the slider pad 82 is located at an interior of the slider housing 20 and is located transversely between the first and second washers 84, 86. In particular, and as perhaps shown best by FIGS. 5 and 6, the slider pad 82 is sandwiched between the first washer 84 and the slider housing 20 at the frontend 64; in another embodiment not specifically illustrated, the slider pad 82 could be sandwiched between the second washer 86 and the slider housing 20 at the rearend 74. Like the slider pad 82, the first washer 84 receives a section of the shaft component and supports the shaft component at the frontend 64 of the slider housing 20. The second washer 86 receives another section of the shaft component and supports the shaft component at the rearend 74 of the slider housing 20. Further, a locker 88 can be provided in order to secure the second washer 86 in place on the shaft component. By way of the slider housing 20 and the first and second washers 84, 86, the shaft and joint assembly 22 is supported and suspended as it spans through the master vanes 26. The shaft and joint assembly 22, and particularly its shaft component, lacks a more direct and immediate support by the master vanes 26 themselves. Still, the slider housing 20 can have more, less, and/or different components in other embodiments.

The shaft and joint assembly 22 serves to transmit user commands inputted to the air vent assembly 10 into operations of the first set of air directive vanes 14, the second set of air directive vanes 16, and/or the shutoff flap 18. The shaft and joint assembly 22 can have various designs, constructions, and components in different embodiments. In the embodiment of the figures—and referring now to FIGS. 4, 5, and 7-9—the shaft and joint assembly 22 includes a shaft 90, a knob 92, a first joint 94, a lever 96, a second joint 98, and a gear 100.

The shaft 90 spans through the slider housing 20. At a first end 102 the shaft 90 carries the knob 92, and at a second end 104 the shaft 90 connects with the first joint 94. The shaft 90 has a single piece construction extending between the first and second ends 102, 104. Along its extent the shaft 90 is outfitted to appropriately interface with the knob 92, with the slider housing 20 and its components, and with the first joint 94. Because of the support at the slider housing 20, the shaft 90 is kept suspended between the master vanes 26. Clearances are hence established between the shaft 90 and the master vanes 26. With particular reference to FIG. 5, a second clearance 106 is established over a crosswise direction 108 between an outside surface 110 of the shaft 90 and a confronting and opposing surface of the upper master vane 26. Further, a third clearance 112 is established over the crosswise direction 108 between the outside surface 110 and a confronting and opposing surface of the lower master vane 26.

The knob 92 presents an input through which a user can physically grip or otherwise grasp and manipulate for commanding operations of the first set of air directive vanes 14, of the second set of air directive vanes 16, and/or of the shutoff flap 18. In this regard, the knob 92 has a knurled outer surface 114 and could have other surface features to aid user manipulation. The knob 92 is the sole knob of the air vent assembly 10 for operating the first and second sets of air directive vanes 14, 16 and the shutoff flap 18, and is the sole class A surface that is visible to a user for manipulation by the user. The knob 92 can be carried by the shaft 90 in different ways. Inter-engaging structures can be employed to mount the knob 92 and the shaft 90 together, or the knob 92 can be a unitary extension of the shaft 90. In FIG. 9, a ring 116 is inserted between the knob 92 and shaft 90 for aiding attachment between the two components.

The first joint 94 establishes the connection between the shaft 90 and the lever 96. In this embodiment, the first joint 94 is of the cardan joint type and hence transmits rotational movement between the shaft 90 and lever 96 while permitting certain pivotal movement therebetween. Referring now to FIG. 9, the cardan joint 94 includes a link yoke 118 and a pin 120. These components assemble together with fork ends 122 extending from the lever 96 to form the cardan joint 94. Still, the first joint 94 can have other designs and constructions and components in other embodiments. The lever 96 spans from the connection at the first joint 94 and spans to the second joint 98. The lever 96 has a single piece construction extending between the fork ends 122 and an opposite balled end with pins 124. The balled end and pins 124 are hinged inside of the gear 100 in order to establish the second joint 98. Like the first joint 94, the second joint 98 transmits rotational movement between the lever 96 and the gear 100 while permitting certain pivotal movement therat by the lever 96 relative to the gear 100. Still, the second joint 98 can have other designs and constructions and components in other embodiments. The gear 100 engages with the gear 50 when driven to rotate by the lever 96. Engagement and meshing between the gears 100, 50 and among their gear teeth works to open and close the first and second flaps 44, 46 of the shutoff flap 18. Driven rotation in one direction moves the shutoff flap 18 open, and driven rotation in the opposite direction moves the shutoff flap 18 close.

Figure 10:
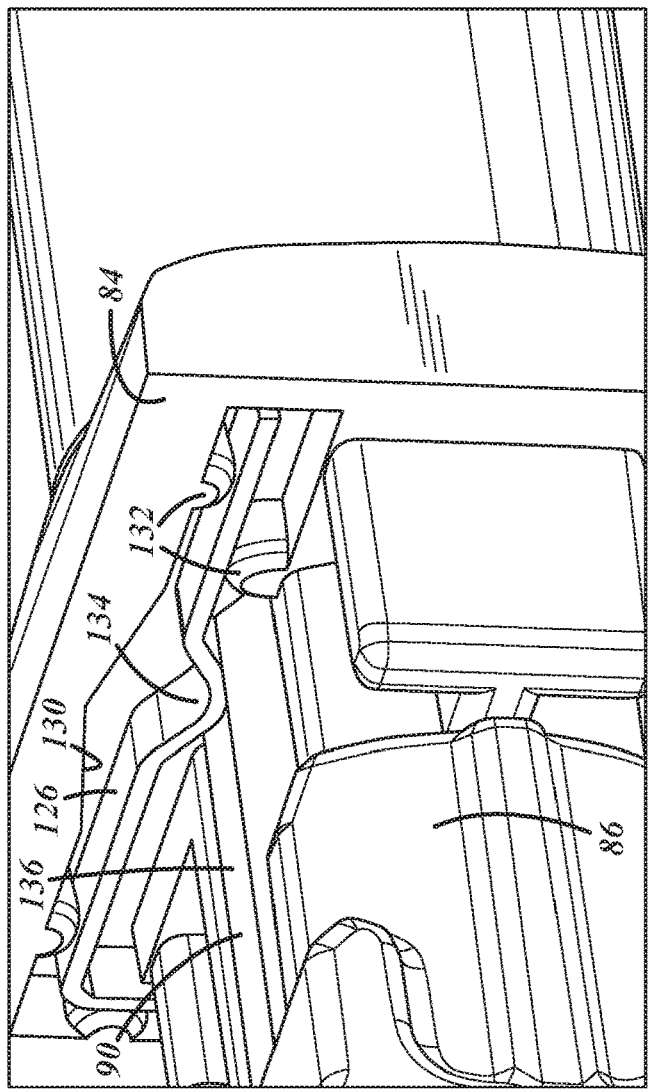
FIG. 10 is an enlarged view of a detent spring of the vehicle air vent manual control assembly.
Figure 11:
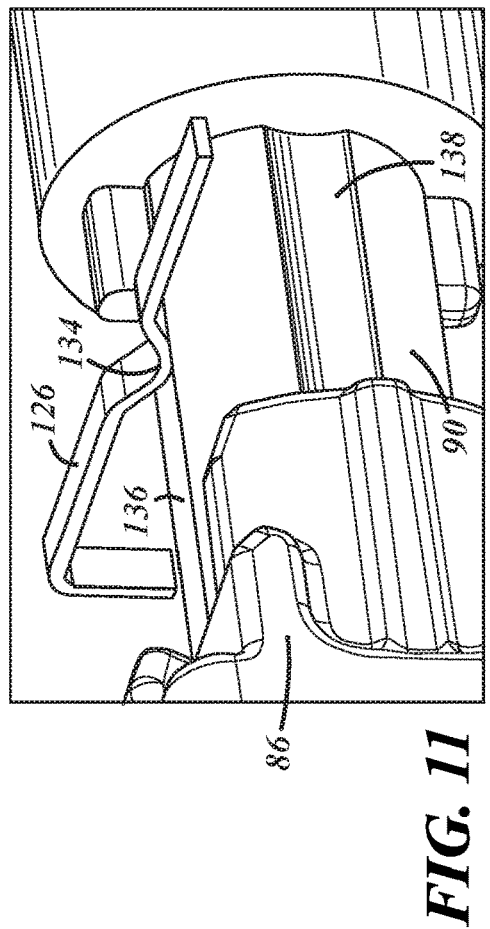
FIG. 11 is an enlarged and somewhat isolated view of the detent spring of the vehicle air vent manual control assembly.

Furthermore, in an embodiment and referring now to FIGS. 10 and 11, the air vent assembly 10 can include a detent spring 126 in order to provide haptic feedback to a user amid rotational movement of the shaft 90 and when the shutoff flap 18 reaches its fully open and closed sates. The haptic feedback can be a change in rotational resistance experienced and felt physically at the knob 92 by the user. It serves as an indication to the user that the shutoff flap 18 is fully open and rotational manipulation can cease in that direction, and conversely that the shutoff flap 19 is fully closed and rotational manipulation can cease in that opposite direction. In this embodiment, the haptic feedback is provided by way of interaction between the detent spring 126 and the shaft 90. The detent spring 126 is held in a cavity 130 of the first washer 84. The cavity 130 resides at a backside of the first washer 84. Lobes 132 projecting interiorly of the cavity 130 serve to retain the detent spring 126 within the cavity 130. The detent spring 126 has a bend 134 in its extent. The bend 134 projects radially toward the shaft 90 relative to immediately surrounding portions of the detent spring 126 (the term radially is used here with reference to the cylindrical shape of the shaft 90). The shaft 90 has a first groove 136 and a second groove 138 residing at its outer surface. The first and second grooves 136, 138 are positioned at the outer surface ninety degrees (90°) apart from each other relative to the cylindrical shape of the shaft 90. The first and second grooves 136, 138 span axially and transversely over the shaft 90, and each have a half-circle shape in sectional profile. When the bend 134 is received and seated in the first groove 136, the shutoff flap 18 is fully open; and when the bend 134 is received and seated in the second groove 138, the shutoff flap 18 is fully closed. The bend 134 rides over the shaft's outer surface as the shaft 90 is rotated between the first and second grooves 136, 138. The act of seating between the bend 134 and the respective groove 136 or 138 furnishes the haptic feedback. In an alternative embodiment, only one of the first or second grooves 136, 138 could be provided, in which case haptic feedback would only occur at the fully open state of the shutoff flap 18 or at the fully closed state of the shutoff flap 18.

In use, directional movements of the first and second set of air directive vanes 14, 16 and open and close movements of the shutoff flap 18 are commanded by the user at the knob 92 and via the air vent assembly 10. The user pivots the shaft 90 up and down and generally in the crosswise direction 108 to prompt movement of the first set of air directive vanes 14 and to thereby aim air upward and downward. The shaft 90 pivots about the first joint 94, and the lever 96 experiences concurrent pivotal movement about the first and second joints 94, 98. When pivoting the shaft 90 up and down, the shaft 90 lacks relative movement with the top and bottom sides 70, 72 of the slider housing 20. To prompt movement of the second set of air directive vanes 16, the user translates the shaft 90 left and right and generally in the lateral direction 58. Air is thereby aimed leftward and rightward. The shaft 90 slides in the slider housing 20 toward and away from the first and second sidewalls 76, 78. The left and right arrows in FIG. 6 are a representation of this translational and side-to-side sliding movement of the shaft 90. Here too, the lever 96 experiences pivotal movement about the first and second joints 94, 98. Lastly, the user rotates the shaft 90 about a shaft axis 128 (FIG. 5) in order to prompt movement of the shutoff flap 18 and to thereby make adjustments to air volume. In an example, the shaft 90 is rotated a total of ninety degrees (90°) in order to bring the shutoff flap 18 from its fully open state and to its fully closed state, and another ninety degrees (90°) in the opposite rotational direction in order to bring the shutoff flap 18 from its fully closed state to its fully open state. The first and second joints 94, 98 transfer this rotation to cause engagement between the gears 50, 100 whether the first and second joints 94, 98 are in a pivoted state or not. In other words, the shutoff flap 18 can close or open at the same time that the first set of air directive vanes 14 are aimed upward/downward and/or at the same time that the second set of air directive vanes 16 are aimed leftward/rightward, for instance.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle air vent manual control assembly, comprising:
    a first set of air directive vanes;
    a second set of air directive vanes arranged generally transverse to the first set of air directive vanes;
    a shutoff flap;
    a slider housing situated between a pair of the first set of air directive vanes via a coupling between the slider housing and the pair of the first set of air directive vanes, the coupling restraining movement of the slider housing with respect to the pair of the first set of air directive vanes, the slider housing comprising a slider pad; and
    a shaft and joint assembly comprising a shaft, a joint, and a knob, the shaft spanning through the slider housing and spanning through the slider pad, the knob carried by the shaft;
    wherein, via user manipulation of the knob, pivotal movement of the shaft at the joint prompts movement of the first set of air directive vanes, translational movement of the shaft relative to the slider housing prompts movement of the second set of air directive vanes, and rotational movement of the shaft about a shaft axis prompts movement of the shutoff flap, and wherein, amid translational movement of the shaft relative to the slider housing, the slider pad translates in the slider housing relative to the slider housing.

2. The vehicle air vent manual control assembly of claim 1, wherein the coupling occurs among first and second sidewalls of the slider housing and vertical inner walls at the pair of the first set of air directive vanes.

3. The vehicle air vent manual control assembly of claim 1, wherein the slider pad receives a section of the shaft and at least partly supports the shaft at the slider housing.

4. The vehicle air vent manual control assembly of claim 3, wherein the slider housing further comprises a first washer that receives a second section of the shaft adjacent a frontend of the slider housing, and comprises a second washer that receives a third section of the shaft adjacent a rearend of the slider housing.

5. The vehicle air vent manual control assembly of claim 1, wherein the slider housing has a first side, a second side, a third side, and a fourth side, and upon translational movement of the shaft relative to the slider housing the shaft translates relative to the first and second sides, and upon pivotal movement of the shaft at the joint the shaft lacks movement relative to the third and fourth sides.

6. The vehicle air vent manual control assembly of claim 1, wherein the slider housing resides wholly within a lateral extent of the pair of the first set of air directive vanes and wholly within a transverse extent of the pair of the first set of air directive vanes.

7. The vehicle air vent manual control assembly of claim 1, wherein the slider housing has a first wall and a second wall, and the translational movement of the shaft and of the slider pad relative to the slider housing is a sliding movement toward and away from the first and second walls.

8. The vehicle air vent manual control assembly of claim 1, wherein the shaft is supported at the slider housing via at least one washer and lacks direct support by the first set of air directive vanes.

9. The vehicle air vent manual control assembly of claim 1, wherein the shaft and joint assembly further comprises a lever, the joint joins the lever and the shaft together, and the joint has a link yoke and a pin at the junction between the lever and the shaft in order to effect relative movement between the lever and the shaft.

10. The vehicle air vent manual control assembly of claim 1, wherein the shaft and joint assembly further comprises a first gear, and upon rotational movement of the shaft about the shaft axis the first gear engages with a second gear of the shutoff flap in order to prompt movement of the shutoff flap.

11. The vehicle air vent manual control assembly of claim 10, wherein the shaft and joint assembly further comprises a lever and a second joint, the lever joined to the shaft via the joint and the lever joined to the first gear via the second joint, the joint transmits rotational movement between the lever and the shaft, and the second joint transmits rotational movement between the lever and the first gear.

12. The vehicle air vent manual control assembly of claim 1,
    wherein the slider housing comprises a slider pad that facilitates translational movement of the shaft relative to the slider housing, comprises a first washer, and comprises a second washer;
    wherein the joint is a cardan joint; and
    wherein the shaft and joint assembly further comprises a lever joined to the shaft via the cardan joint, further comprises a first gear engageable with a second gear of the shutoff flap, and further comprises a second joint that joins the lever and the first gear together.

13. The vehicle air vent manual control assembly of claim 1, wherein a first clearance resides in a transverse direction between forward ends of the pair of the first set of air directive vanes and the slider housing, a second clearance resides in a crosswise direction between a first confronting surface of a first of the pair of the first set of air directive vanes and an outside surface of the shaft adjacent the first clearance, and a third clearance resides in a crosswise direction between a second confronting surface of a second of the pair of the first set of air directive vanes and the outside surface of the shaft adjacent the first clearance.

14. The vehicle air vent manual control assembly of claim 1, wherein the knob is a single knob of the vehicle air vent manual control assembly, and wherein movement of the first set of air directive vanes and movement of the second set of air directive vanes and movement of the shutoff flap are all prompted via user manipulation of the single knob.

15. A vehicle air vent manual control assembly, comprising:
    a first set of air directive vanes;
    a second set of air directive vanes arranged generally transverse to the first set of air directive vanes;
    a shutoff flap;

a slider housing situated between a pair of the first set of air directive vanes; and a shaft and joint assembly comprising a shaft, a joint, and a knob, the shaft spanning through the slider housing, the knob carried by the shaft;

wherein, via user manipulation of the knob, pivotal movement of the shaft at the joint prompts movement of the first set of air directive vanes, translational movement of the shaft relative to the slider housing prompts movement of the second set of air directive vanes, and rotational movement of the shaft about a shaft axis prompts movement of the shutoff flap, and wherein a detent spring interacts with at least one groove of the shaft and provides haptic feedback to a user amid rotational movement of the shaft about the shaft axis and when the shutoff flap is at a fully closed state or is at a fully open state.

\* \* \* \* \*